Figure 1:
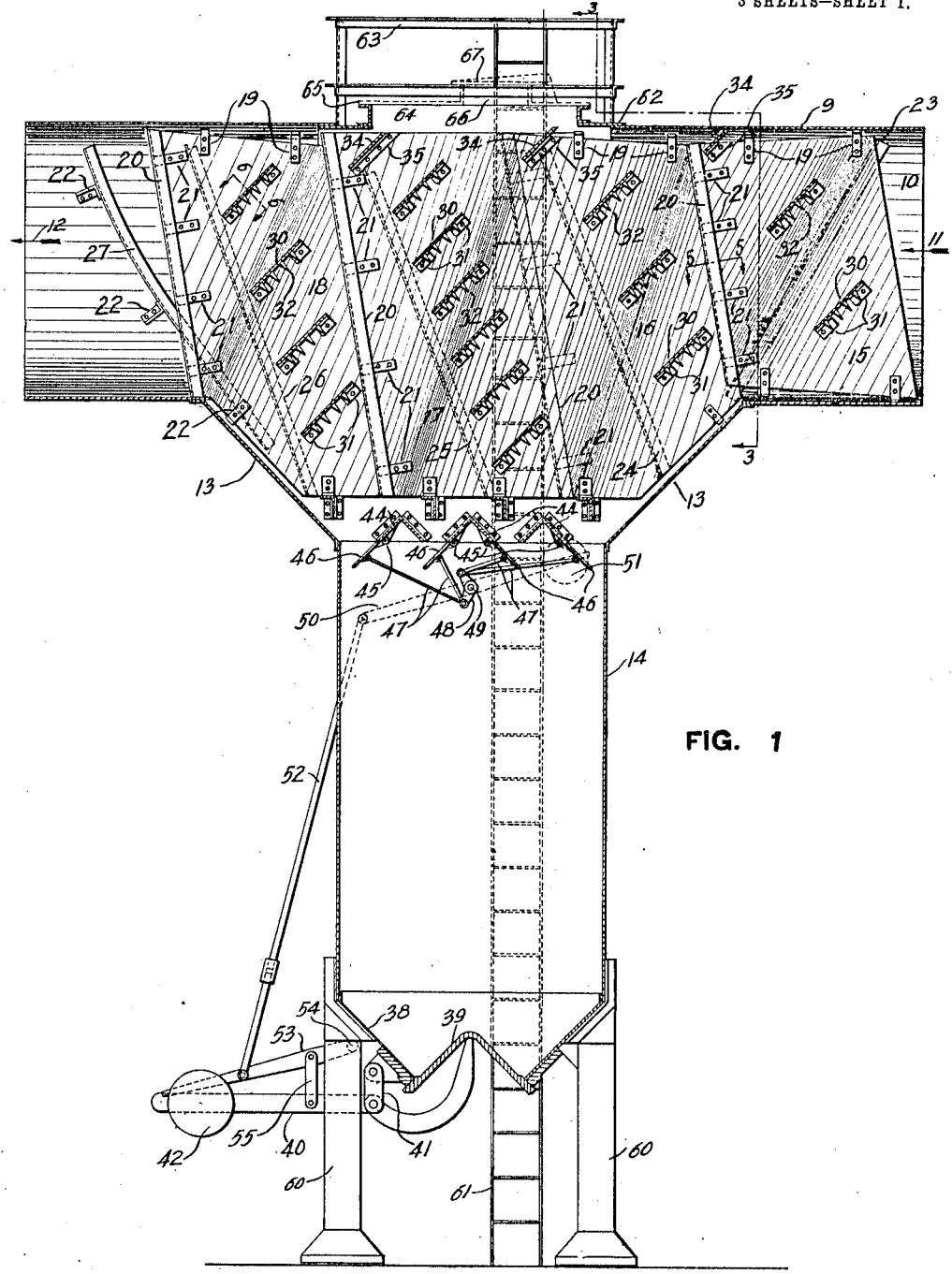

P. MEEHAN.
GAS CLEANER.
APPLICATION FILED JULY 31, 1911.

1,035,892.

Patented Aug. 20, 1912.

3 SHEETS—SHEET 1.

WITNESSES
Ida C. Staver.
W. C. Lyon

INVENTOR
Patrick Meehan
By Fredk. W. Winter
Attorney

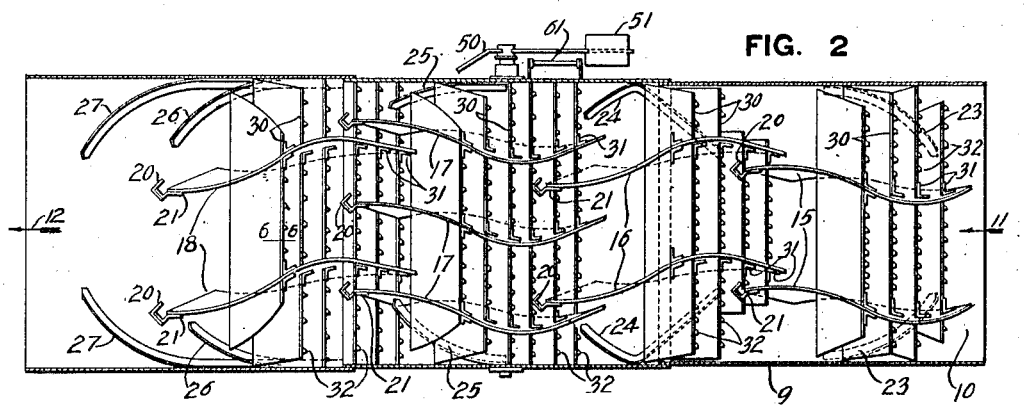
FIG. 2
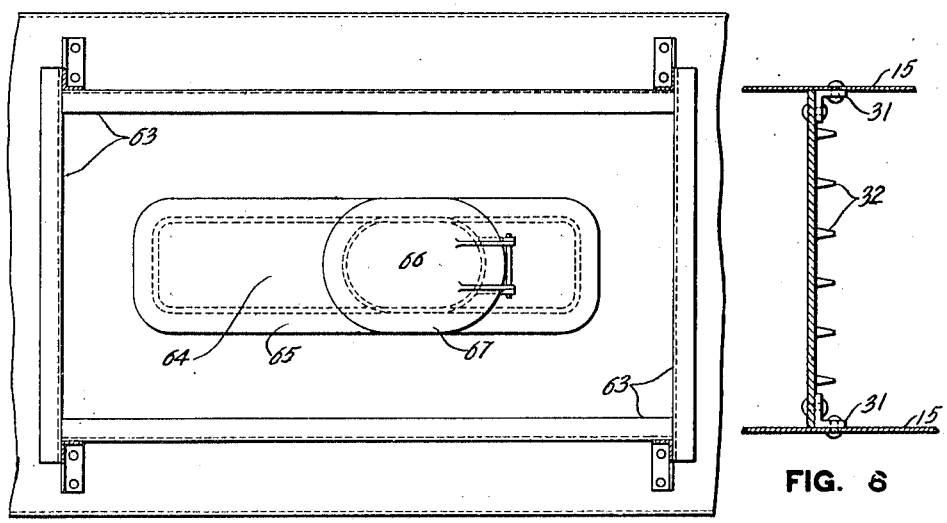
FIG. 4
FIG. 6
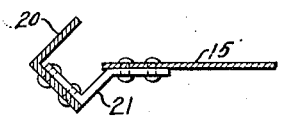
FIG. 5
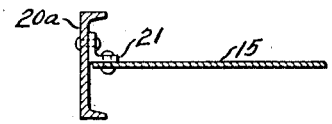
FIG. 7

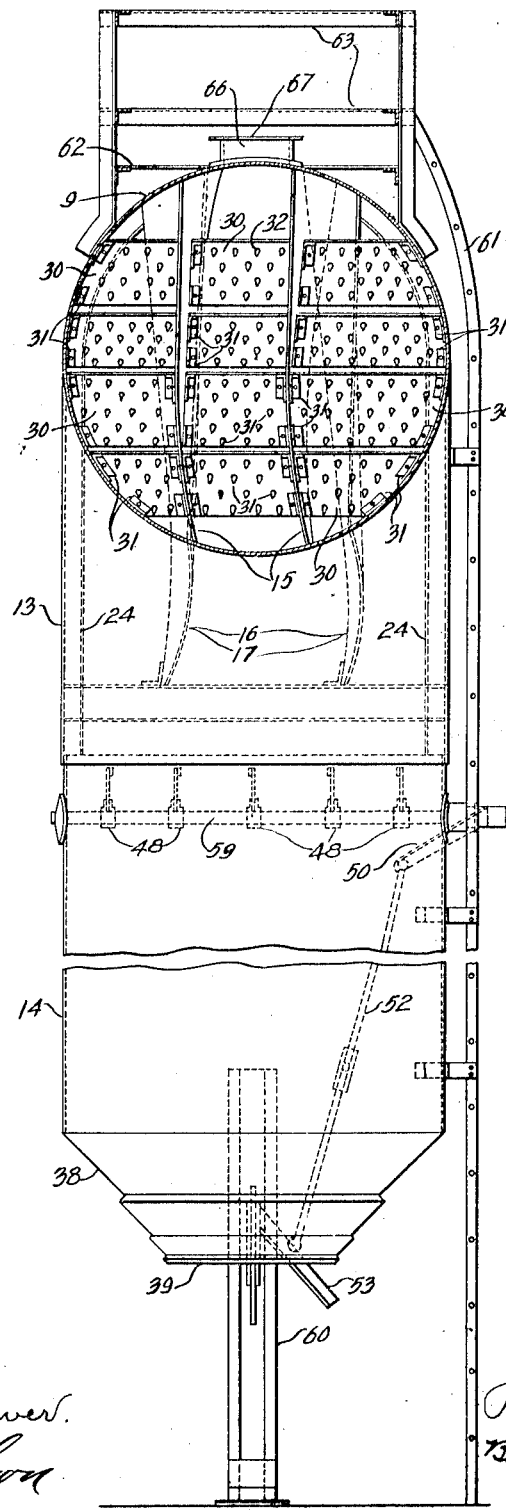

UNITED STATES PATENT OFFICE.

PATRICK MEEHAN, OF LOWELLVILLE, OHIO.

GAS-CLEANER.

1,035,892.  Specification of Letters Patent.  Patented Aug. 20, 1912.

Application filed July 31, 1911. Serial No. 641,581.

*To all whom it may concern:*

Be it known that I, PATRICK MEEHAN, a resident of Lowellville, in the county of Mahoning and State of Ohio, have invented a new and useful Improvement in Gas-Cleaners, of which the following is a specification.

This invention relates to gas cleaners and more particularly to apparatus for cleaning gas furnace gases.

The object of the invention is to provide a dry gas cleaner, *i. e.*, one in which no water is used and which will thoroughly free the gas from all dust and other solid matter, and also from moisture and other impurities.

Gas is ordinarily cleaned by means of washers, *i. e.*, apparatus through which the gas is passed and in which it comes in contact with or passes through water which washes out the dust and other impurities. In some localities washers are objectionable on account of draining into streams and polluting them with the wash water which frequently contains highly injurious impurities. In other localities where water is scarce, to secure the required amount of water for such washers is a serious problem, and power is, of course, necessary to circulate the water, and there is also more or less leakage from such washers which makes the surroundings wet and sloppy.

In my Patent No. 955,651, granted April 19, 1910, is described and claimed apparatus for cleaning gas whereby the aforesaid difficulties are overcome and wherein the gas is cleaned entirely in a dry state and without the use of any water whatsoever. The present invention, like that of my patent above identified, also operates entirely by a dry process and without the use of any water whatsoever, and is an improvement on the apparatus shown in my aforesaid patent, the apparatus being cheaper to construct and equally, if not more effective, in removing the impurities from the gas.

The invention comprises the construction, arrangement and combination of parts hereinafter described and claimed.

In the accompanying drawings, Figure 1 is a vertical section through the improved gas cleaner; Fig. 2 is a top view thereof with the shell broken away to show the interior parts; Fig. 3 is an elevation with the upper part in section on the line 3—3, Fig. 1; Fig. 4 is a top view of the central portion of the apparatus; Fig. 5 is an enlarged section on the line 5—5, Fig. 1, through a baffle plate taken transversely of the dust collecting gutter; Fig. 6 is a transverse section on the line 6—6, Figs. 1 and 2, showing the transverse baffles and the manner of connection to the main baffles, and Fig. 7 is a view similar to Fig. 5 showing a modification.

The apparatus, like that of my Patent No. 955,651, operates on the principle of beating the dust and other impurities out of the gas by causing the gas to flow over and between suitable baffle plates so constructed that the moisture, dust and other solid matter striking against such plates falls by gravity, and providing suitable gutters or ledges to conduct such solid matter to a suitable dust collector.

The apparatus comprises in its essential features, a casing 9 inclosing a chamber 10 which forms the dust separator, and provided with an inlet 11 for the gas at one side and the outlet 12 in the opposite side, the gas passing substantially horizontally through the dust separating chamber 10. The chamber 10 is practically a continuation or section of the conduits 11 and 12, but is enlarged somewhat by extending the casing downwardly with sloping walls 13 which connect to a vertical casing 14 forming the dust collecting chamber or catcher.

Within the casing 9 are located the baffle plates for beating out of the gas the impurities carried thereby. The main baffle plates are disposed substantially vertically and run longitudinally in the conduits and chamber. As shown, there are four sets of such plates; the first set comprising two plates 15, the next set comprising two plates 16, the third set comprising three plates 17, and the final set comprising two plates 18. The plates of each set are arranged to break joints with those of the adjacent set, as shown in plan view, Fig. 2. Each of these plates is of twisted or spiral conformation, so as to offer more points of contact with the gas, and also to guide downwardly the impurities which are beaten out of the gas by contact with said plates. These plates are secured in the casing 9 in any suitable way, the drawing showing angle clips 19 riveted to the plates and to the shell or casing 9. Each of these plates is provided with a gutter or ledge for conducting the impurities which are caught thereby downwardly toward dust collecting chamber 14. These gutters or ledges may be of various forms, such as the Z or angle gutters illustrated in my Patent No. 955,651, and are shown in the form of troughs secured to the rear edges of the baffle plates. In Figs. 1, 2, 3 and 5 these are shown in the form of sections of angle members 20 located slightly beyond the rear edges of the plates and secured thereto by angle clips 21, the angle gutter members being so located as to project beyond the side faces of the plates on both sides so as to catch the solid matters drifting along both faces of the plates. The plates themselves are slightly inclined from the bottom toward the top in the direction of the flow of the gas and these gutters or troughs conduct the solid matters downwardly toward the outlet opening from the bottom of the casing 9.

Fig. 7 shows a modification wherein, in lieu of angle shaped gutters, channel shaped gutters 20ª are used. Various other forms of gutters will answer the purpose equally as well. I also prefer to secure to the inner wall of the shell or casing 9, a number of ledges or gutters for catching any solid matters which drift along the inner face of such casing. A number of such are shown, being in the form of angle members secured to the shell by means of angle clips 22. The drawings show a pair of initial gutters 23 near the admission opening 11, and four other such pairs of gutters, 24, 25, 26 and 27, distributed along the casing 9, the last pair being in proximity to the outlet opening 12.

In addition to the vertical longitudinal baffles described, I also provide transverse baffles between the main baffle plates, these being indicated at 30, and being set on an incline so as to throw the gas downwardly. These transverse baffles are formed in sections, fitted between the vertical baffles and are secured thereto and to the shell by means of angle clips 31. Preferably these baffles are provided on their under faces with a number of projections 32 of considerable length and irregularly placed or staggered, and serve as additional means for beating out of the gas the solid matters carried thereby. Any desired number of transverse baffles 30 may be employed. The drawings show two between the initial set of vertical baffle plates 15, three between the next succeeding set of vertical baffle plates 16, six between the next succeeding set of vertical baffle plates 17 and four between the final set of vertical baffle plates 18. Their number, however, may be varied.

Preferably at the top of casing 9, I provide a number of inclined plates 34, three such plates being shown, for the purpose of deflecting downwardly the stream of gas flowing along the upper wall of said casing. These inclined plates are also formed in sections fitted between the vertical baffle plates, and secured thereto and to the shell or casing 9 by angle members 35.

The dust receiving chamber or catcher 14 is illustrated as of tubular form provided at its lower end with a hopper 38 whose discharge opening is closed by means of a bell valve 39, the latter being operated by lever 40 fulcrumed on the swinging link or member 41 and provided at the outer end with an adjustable counter weight 42.

In order to prevent the gas from flowing out when the bell 39 is lowered to remove the dirt from the catcher, I preferably provide between the catching chamber 14 and the separating chamber 10, a valve or valves which can be closed when removing the dirt from the catcher. As shown in the drawing, in the lower part of the casing 9 are a plurality of transverse members, shown as ridges 44, and hinged to these at 45 are a plurality of valves or shutters 46 adapted to close the spaces between ridges 44 and at the sides thereof. Each of these shutters has pivoted thereto one end of a connecting rod 47, the other ends of which are pivoted to arms or cranks 48 on a rock shaft 49. One end of said shaft extends outside of the dust catching chamber and has secured thereto an arm or lever 50 which at one end is provided with an adjustable counter weight 51, and having pivoted to its opposite end the upper end of an adjustable connecting rod 52 whose lower end is pivoted to a lever 53, fulcrumed at 54 and connected by link 55 to the bell operating lever 40. These parts are so arranged that when the bell 39 is closed, the valves 46 are open, thereby permitting the dust and other impurities to drop from the separating chamber 10 into the collecting chamber 14. When the bell 39 is lowered to remove from the collecting chamber the dust accumulated therein, the connections from lever 40 to the valve 46 close said valves, thereby cutting off communication between separating chamber 10 and dust collecting chamber 14 and preventing gas from blowing out of the collecting chamber when the bell is open.

The dust catcher is mounted upon suitable pillars 60 to elevate the same sufficiently to allow of a cart or the like being brought under the same to receive the discharge therefrom. A ladder 61 runs to the top to a suitable working platform 62 and protecting railing 63. In the top of the casing is an oval or elongated manhole 64 of sufficient size to permit of the removal and insertion therethrough of the largest sized baffle plates in the interior. This manhole is closed by cover 65 which in turn is provided with a small manhole 66 closed by cover 67, through which workmen can enter for the purpose of repairs or cleaning.

The casing 9, as well as the collecting chamber 14 may, if desired, be lined with fire brick and the like, although this is not necessary.

In the use of the apparatus, the gas enters through conduit 11 and leaves through conduit 12, flowing through the chamber 10 where it is split into a number of streams by means of the vertical baffle plates and is deflected downwardly somewhat by the transverse baffles 30. The chamber 10 is somewhat larger than the inlet and outlet openings to compensate for the space occupied by the various baffle plates, and also to allow the gas to expand and thereby lose part of its velocity, which causes the impurities to drop out by gravity. The solid and heavier matters when they strike against the baffle plates and shell of the casing, have a tendency to drift along the surface of the baffles and the shell, unless sufficiently heavy to drop by gravity. Such parts as do not fall by gravity are caught by the various ledges and gutters and conducted thereby to the lower part of the casing, whence they either drop directly into the collecting chamber 14 or upon the sloping walls 13 and slide down the latter into the said collecting chamber. The gas is thereby cleared of all solid matters and moisture and without the use of water. The cleaner is strictly a dry cleaner and is not open to the objection of gas washers, viz. the pollution of the streams with the wash water, the difficulty of securing sufficient water in certain localities, the power necessary to pump and circulate the water, and the sloppy, slushy condition around gas washers.

The apparatus described is also useful for removing moisture from gas which has been washed. It can also be used to clean producer gas either as it comes from the producer, or in the pipes which lead to stoves or boilers. The apparatus can also be used as a dust catcher for any purpose where it is desired to free gas or air from dust but without necessarily afterward utilizing the air or gas. It may also be used to condense fumes from lead, zinc, silver, copper and other smelters and to collect the fine particles of these metals and ores which generally escape into the atmosphere. The apparatus can be made of suitable dimensions to effectively condense the fumes and collect the condensed metallic particles. For this purpose, special cooling arrangements may be supplied.

The term "gas cleaners" as used in the specification and in the claims, is intended to cover any of the uses above named.

The cleaner described is of comparatively small size for its capacity and is cheap to construct and erect, and also not liable to derangement or wear. It can be placed in any suitable part of the gas mains. It can be used in a curved pipe or at an elbow equally as well as in a straight pipe, and can also serve as a support for the pipe, curve or elbow. It takes up very little ground space, not more than the ordinary supports which must be under the pipe.

What I claim is:—

1. A dry gas cleaner comprising a separating chamber provided with an inlet and outlet arranged to conduct the gas horizontally therethrough, a collecting chamber connected to the open bottom of said separating chamber and arranged to support the latter, baffle plates in said separating chamber in the path of the stream of gas, and gutters on said baffle plates projecting beyond the faces thereof and leading downwardly and forwardly toward the inlet and toward the collecting chamber.

2. A dry gas cleaner comprising a separating chamber provided with inlet and outlet arranged to conduct the gas horizontally therethrough, a collecting chamber connected to the open bottom of said separating chamber and arranged to support the latter, supports for the collecting chamber, vertical baffle plates in said separating chamber in the path of the stream of gas, and gutters on the rear edges of said baffle plates projecting beyond the faces thereof and leading downwardly toward the collecting chamber.

3. A dry gas cleaner comprising a pair of horizontally arranged conduits, a casing therebetween extending downwardly below the conduits and forming a horizontally disposed separating chamber, a collecting chamber connected to the open bottom of said separating chamber and vertically disposed longitudinally arranged spiral baffle plates in said separating chamber in the path of the stream of gas, said plates extending downwardly to the bottom of the separating chamber.

4. A dry gas cleaner comprising a pair of horizontally arranged conduits, an enlarged casing therebetween and extending downwardly below the conduits and forming a horizontally disposed separating chamber, a collecting chamber connected to the open bottom of said separating chamber, vertically disposed longitudinally arranged spiral baffle plates in said separating chamber in the path of a stream of gas, said plates extending downwardly to the bottom of the separating chamber, and gutters on the plates projecting beyond both faces thereof and leading downwardly toward the collecting chamber.

5. A dry gas cleaner comprising a separating chamber provided with inlet and outlet arranged to conduct the gas horizontally therethrough, a collecting chamber connected to the open bottom of said separating chamber, vertically disposed longitudinally arranged spiral baffle plates in said separating chamber in the path of the stream of gas, and transverse baffle plates located between said vertical plates.

6. A dry gas cleaner comprising a separating chamber provided with inlet and outlet arranged to conduct the gas horizontally therethrough, a collecting chamber connected to the open bottom of said separating chamber, vertically disposed longitudinally arranged spiral baffle plates in said separating chamber in the path of the stream of gas, and transverse baffle plates located between said vertical plates and inclined from the horizontal.

7. A dry cleaner comprising a separating chamber provided with inlet and outlet arranged to conduct the gas horizontally therethrough, a collecting chamber connected to the open bottom of said separating chamber, vertically disposed longitudinally arranged spiral baffle plates in said separating chamber in the path of the stream of gas, and transverse baffle plates located between said vertical plates, said transverse plates being provided with projections or protuberances.

8. A dry gas cleaner comprising a separating chamber provided with inlet and outlet arranged to conduct the gas horizontally therethrough, a collecting chamber connected to the open bottom of said separating chamber, vertically disposed longitudinally arranged spiral baffle plates in said separating chamber in the path of the stream of gas, transverse baffle plates located between said vertical plates and inclined from the horizontal, and inclined transverse plates in the top of the separating chamber.

9. A dry gas cleaner comprising a separating chamber provided with inlet and outlet arranged to conduct the gas horizontally therethrough, a collecting chamber connected to the open bottom of said separating chamber, vertically disposed longitudinally arranged spiral baffle plates in said separating chamber in the path of the stream of gas, gutters or ledges on said baffle plates leading downwardly toward the collecting chamber, and ledges or gutters on the side walls of said chamber leading downwardly toward the collecting chamber.

10. A dry gas cleaner comprising a separating chamber provided with inlet and outlet arranged to conduct the gas horizontally therethrough, a collecting chamber connected to the open bottom of said separating chamber, and a plurality of sets of vertically disposed longitudinally arranged spiral baffle plates in said chamber, the plates of the successive sets overlapping and being arranged relative to each other so as to split the streams of gas passing between a preceding set of plates.

11. A dry gas cleaner comprising a separating chamber provided with inlet and outlet arranged to conduct the gas horizontally therethrough, a collecting chamber connected to the open bottom of said separating chamber, a plurality of sets of vertically disposed longitudinally arranged spiral baffle plates in said chamber, the plates of the successive sets overlapping and being arranged relative to each other so as to split the streams of gas passing between a preceding set of plates, and ledges or gutters on said plates leading downwardly toward the collecting chamber.

12. In a dry gas cleaner the combination of a separating chamber, a collecting chamber connected to the bottom of said separating chamber, there being a plurality of openings between said chambers, a plurality of movable valves between the separating and collecting chambers, said valves being each pivoted at one side of one of said openings, a lever connected to operate all of said valves, a valve in the bottom of the collecting chamber, and means coupled with the lever and the valve in the collecting chamber arranged to so operate the valves that when the bottom valve is opened the top valves can be closed.

13. In a dry gas cleaner, the combination of a separating chamber, a collecting chamber connected to the open bottom of said separating chamber, there being a plurality of openings between said chambers, a plurality of pivoted valves between the separating and collecting chambers, said valves being in a common horizontal plane and each covering an opening, a rotatable shaft mounted in the collecting chamber below the valves, levers and links connecting said shaft to each of said valves, a valve in the bottom of the collecting chamber, and levers and connecting mechanism for operating said shaft and collecting chamber valve simultaneously and so arranged that when the bottom valve is open the top valves are closed, and vice versa.

In testimony whereof, I have hereunto set my hand.

PATRICK MEEHAN.

Witnesses:
MARIE MEEHAN,
W. B. MOORE.

Copies of this patent may be obtained for five cents each, by addressing the "Commissioner of Patents, Washington, D. C."